United States Patent [19]
Müller et al.

[11] Patent Number: 6,152,827
[45] Date of Patent: Nov. 28, 2000

[54] SWITCHABLE CLAW COUPLING

[75] Inventors: Peter Müller, Wilthen; Stefan Rauschenbach, Grosspostwitz; Andreas Roth, Kirschau, all of Germany

[73] Assignee: GKN Walterscheid Getriebe GmbH, Kirschau, Germany

[21] Appl. No.: 09/243,496

[22] Filed: Feb. 3, 1999

[30] Foreign Application Priority Data

Feb. 4, 1998 [DE] Germany .......................... 198 04 071

[51] Int. Cl.[7] .................................................... F16D 3/10
[52] U.S. Cl. ................................ 464/160; 464/30; 464/38
[58] Field of Search .............................. 464/38, 39, 32, 464/33, 30, 37; 192/69.83, 69.81, 56.61, 89.27

[56] References Cited

U.S. PATENT DOCUMENTS

| | | |
|---|---|---|
| 1,330,965 | 2/1920 | White ................................ 192/89.27 |
| 1,881,728 | 10/1932 | Levedahl . |
| 2,366,461 | 1/1945 | Shoreys ................................ 192/69.81 |
| 3,738,122 | 6/1973 | Ricks . |
| 4,593,800 | 6/1986 | Ness et al. ................................ 464/38 |
| 5,365,841 | 11/1994 | Uhrig ........................................ 464/30 |
| 5,524,870 | 6/1996 | Tallent et al. . |

FOREIGN PATENT DOCUMENTS

| | | |
|---|---|---|
| 0 301 441 A1 | 2/1989 | European Pat. Off. . |
| 1419853 | 10/1965 | France . |
| 1140031 | 11/1962 | Germany . |
| 28 01 135 C3 | 2/1981 | Germany . |

*Primary Examiner*—Lynne H. Browne
*Assistant Examiner*—Aaron Dunwoody
*Attorney, Agent, or Firm*—Harness, Dickey & Pierce, P.L.C.

[57] ABSTRACT

A switchable claw coupling has two rotatably arranged coupling parts (2, 3). One of said coupling parts (3) is axially movable. To reduce the loads on the claws (20, 21) during the coupling operation, the coupling part 3 has a cam (22). The cam (22) at its end face is able to slide on a supporting face 28 of the other coupling part (2). A recess (23), in the supporting face (28), is engaged by the cam (22) to enable engagement within only a limited range.

4 Claims, 4 Drawing Sheets

SWITCHABLE CLAW COUPLING

CROSS-REFERENCE TO RELATED APPLICATION

This application is based upon and claims priority to German Patent Application 198 04 071.7 filed Feb. 4, 1998, which is herein expressly incorporated by reference.

BACKGROUND OF THE INVENTION

The invention relates to a claw coupling. The coupling connects in a rotationally fast way, two components which are rotatable around an axis of rotation. The coupling includes a first axially fixed coupling part which, at its end face, is provided with first claws. A second coupling part which, at its end face, is provided with second claws, faces the first claws. The second coupling part is adjustable along the axis of rotation between a coupled position and an uncoupled position. In the coupled position, the first and second claws engage one another. In the uncoupled position, first and second claws are disengaged.

DE 28 01 135 C3 shows a torque limiting coupling which has a switchable claw coupling. The claw coupling has two rotatably arranged coupling parts which have corresponding driving claws which face one another. In a torque transmitting position the driving claws engage one another. If a certain torque value is exceeded, one coupling part is transferred into a free-wheeling position while the driving claws are disengaged. A switching pin is provided to transfer the coupling back into the torque transmitting position. The switching pin is axially movably positioned in a bore in a driving claw of one coupling part. The bore extends parallel to the axis of rotation. A stop cam is connected to the other coupling part in a rotationally fast way. The stop cam pushes the switching pin into an opposed gap between two driving claws during the re-engagement process. This means that initially, torque is transmitted by the switching pin. As the switching process continues, the driving claws slide on one another via chamfers until they fully engage one another. A disadvantage of this embodiment is that initially, during the switching-in process, torque is only transmitted by the switching pin. As the switching-in process continues, the driving claws transmit torque. However, the claws are not yet fully engaged relative to one another. This leads to a high load on the claw coupling. Furthermore, the claw with the bore for the switching pin has a weakened cross-section.

SUMMARY OF THE INVENTION

It is an object of the invention to provide a switchable claw coupling where the load on the claws during the switching-in process are reduced.

In accordance with the invention, one of the two coupling parts, at its end face, includes at least one annular supporting face. The annular face extends co-axially relative to the axis of rotation. At least one cam, which rests against the annular face, is associated with the other one of the two coupling parts. The cam is able to slidingly support itself on its end face with the first and the second claws disengaged. A recess extends over part of the circumference of the supporting face. The recess is axially engaged by the cam. This engagement enables the second coupling part to move into the coupled position. When the cam is in the coupled position in the second coupling part, when viewed in the circumferential direction, the cam is not contacting any recess end in any of the two directions of rotation.

If the one coupling part includes a supporting face with exactly one recess which, if viewed in the circumferential direction, is approximately as long as a gap between adjoining claws, and if the other coupling part has one cam, the second coupling part can only be transferred into the coupled position in one particular pairing of the first and second claws relative to one another. If the second coupling part is re-set with the first and second claws, assuming a pairing relative to one another different from the particular pairing, the cam initially slides on the supporting face and holds the first and second claws out of engagement until the cam has reached the recess and engages the recess. This enables the second coupling part to move into the coupled position. Thus, switching error, due to the edges of the claws meeting one another and sliding on one another without the claws engaging one another, is only possible with one particular pairing of the first and second claws relative to one another. Thus, the probability of a switching error occurring is greatly reduced.

In order to prevent the claws from transmitting torque before they have completely engaged one another, the first and second claws, if viewed in the circumferential direction, are shorter than the gap formed between each two adjoining claws. If the claws engage one another at the start of a gap when viewed in the circumferential direction, which is always the case when the cam enters the recess after sliding on the supporting face, the claws are able to more deeply engage one another before reaching a torque transmitting position.

According to an advantageous embodiment, the recess is formed by a portion of an annular groove. The cam is a cylindrical bolt or pin positioned in a blind hole of the respective coupling part.

In order to avoid switching errors when the first and second claws are paired relative to one another, where the pairings would enable the claw coupling to be connected, part of the recess starting from at least one end is covered by a cover. In the coupled position of the second coupling part, the cover is adjustable. The cam adjusts the cover against a spring force to at least partially uncover the recess. If the first and second claws are paired relative to one another where the second coupling part is moved into the coupled position where the two coupling parts assume an angular position relative to one another, and where a switching error is to be expected in the angular position, engagement of the claw coupling is avoided in these cases. In such a case, when the second coupling part is reset, the cam, at its end face abutting the cover, slides as far as the supporting face. The cam continues to slide on the supporting face until it has reached the recess and engages the recess. The cam abuts the circumference of the cover and moves the cover against a spring force before the claws have reached a torque transmitting position. The cover at least partially uncovers the recess until the claws have reached the torque transmitting position. After the claw coupling has been disconnected and after, in consequence, the cam has moved out of the recess, the cover is returned by the spring force into the starting position.

From the following detailed description, taken in conjunction with the drawings and subjoined claims, other objects and advantages of the present invention will become apparent to those skilled in the art.

BRIEF DESCRIPTION OF THE DRAWINGS

Below, the preferred embodiments of the invention will be illustrated in the drawings wherein.

DETAILED DESCRIPTION OF THE PREFERRED EMBODIMENT

Figure 1:
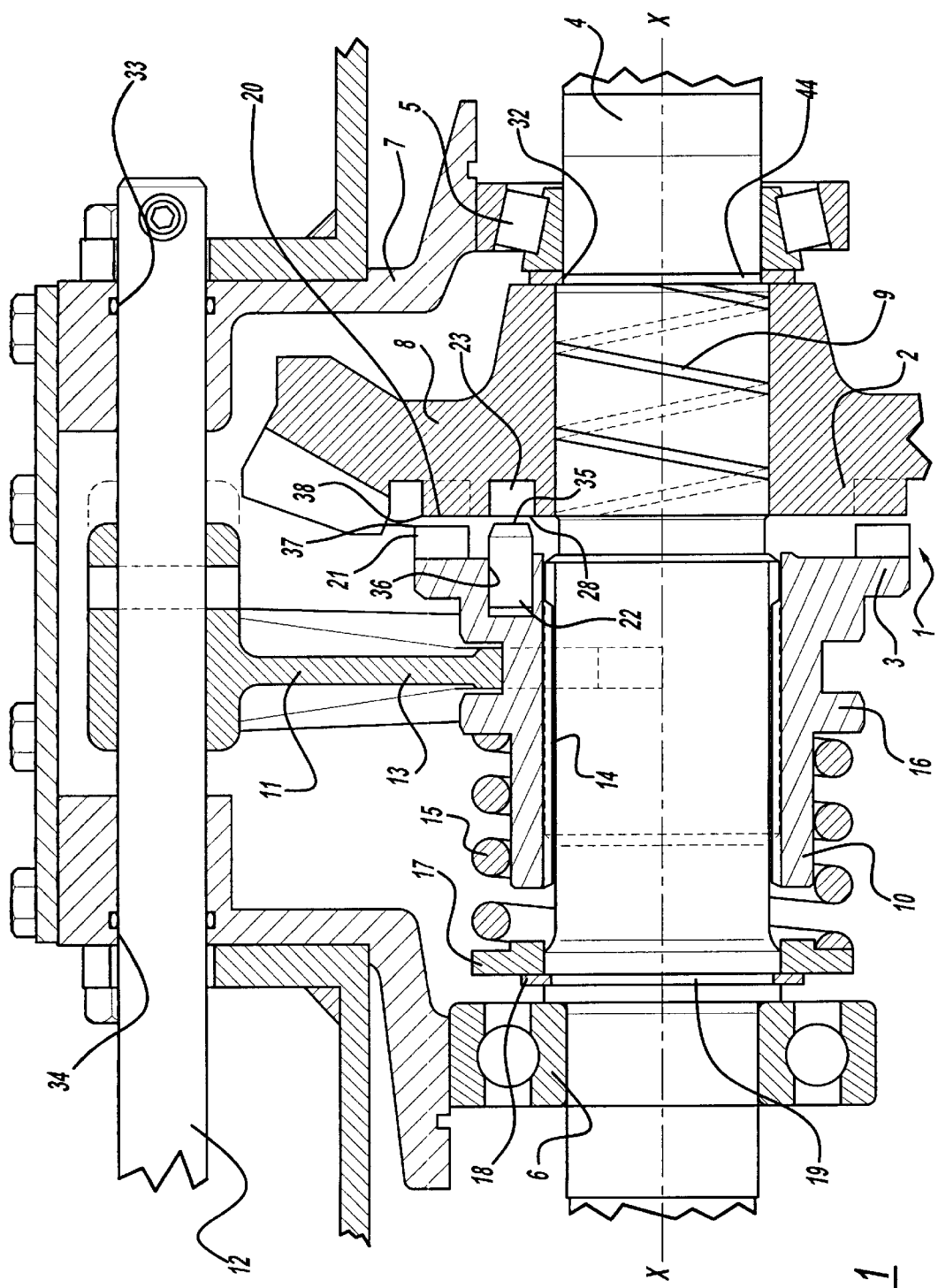
FIG. 1 is a longitudinal section view through a gear drive with a claw coupling in accordance with the invention.

FIG. 1 shows a gear drive which includes an inventive claw coupling 1. The coupling 1 has a first coupling part 2 associated with a gear 8. A second coupling part 3 is associated with a switching muff 10. The gear 8 is supported on a shaft 4. The gear 8 is axially fixed on the shaft 4. However, the gear 8 is rotatable on the shaft 4. The shaft 4 is supported by rolling bearings 5, 6 in the drive housing 7. A spiral-shaped lubricating groove 9 is provided on the circumference of the shaft 4 in the region of the gear 8 to enable the gear 8 to slide hydro-dynamically around the shaft 4.

The switching muff 10 is attached to the shaft 4 by a splined connection 14. The muff 10 is axially movable, however, it is rotationally fast. The switching muff 10 is actuated by a switching yoke 11. The switching yoke 11 engages a circumferential groove 13 of the switching muff 10.

A switching shaft 12 is provided which extends axis-parallel to the shaft 4. The switching shaft is connected to the switching yoke 11. The switching shaft 12 is guided out of the drive housing through sealed bores 33, 34 provided in the drive housing 7.

The switching muff 10, together with the second coupling switching part 3, is supported by a spring 15 against a flange 16 and a disc 17. The switching muff 10 is loaded in the direction of the second coupling part 3. The disc 17 is slid onto the shaft 4 and is axially supported against a securing ring 18. The securing ring 18 engages a circumferential groove 19 in the shaft 4.

The coupling parts 2, 3 include first claws 20 and second claws 21. The claws 20, 21 face one another. A recess 23 is provided in the first coupling part 2 to ensure that the claw coupling is only connected in certain angular positions of the two coupling parts 2, 3 relative to one another. The recess 23 extends over part of an annular supporting face 28.

The second coupling part 3 includes a cam 22. The cam 22 is in the form of a cylindrical pin. The cam 22 is positioned in and projects from a blind hole 36. The blind hole 36 extends parallel to the axis of rotation X—X. The blind hole 36 is arranged at the same distance from the axis of rotation X—X as is the recess 23.

The end face 35 of the cam 22 projects axially beyond the end faces 37 of the second claws 21. The end faces 38 of the first claws 20 are flush with the supporting face 28. In order to reset the second coupling part 3 to transfer the coupling part 3 into the coupled position, the end face 35 slides on the supporting face 28 without the first claws 20 and second claws 21 engaging one another. Only when the cam 22 enters the recess 23 is it possible for the first claws 20 and second claws 21 to fully engage one another.

Figure 2:
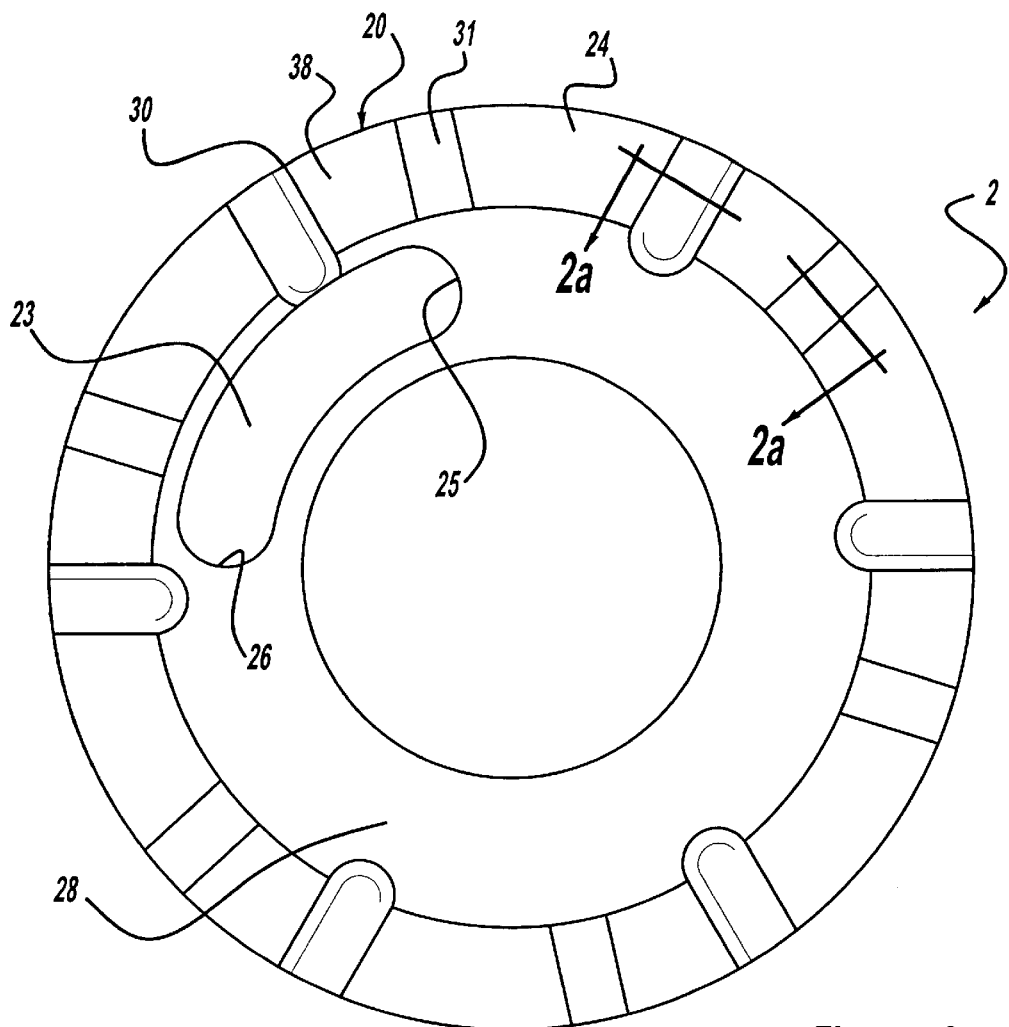
FIG. 2 is a plan view of a first coupling part with a supporting face and a recess.
Figure 2A:
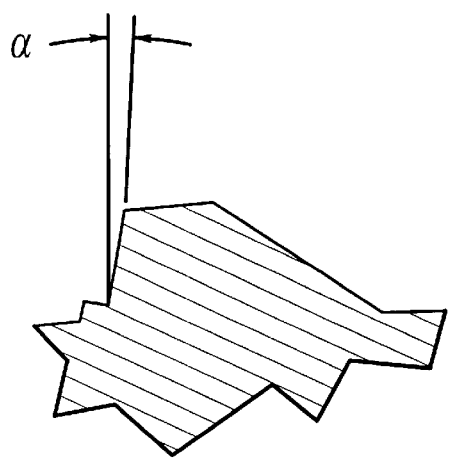
FIG. 2a is a cross-section view of the first coupling part along line 2a—2a thereof.

FIG. 2 illustrates a first coupling part 2 according to FIG. 1. The first claws 20 each include torque transmitting flanks 30, 31. Each torque transmitting flank 30, 31 extends at an angle α towards the end face 38 of a first claw 20. Thus, the first claws 20 are tapered and wedge-like towards the end face 38. First gaps 24 are formed between each two adjoining first claws 20. If viewed in the circumferential direction, the first gaps 24 are circumferentially longer than the first claws 20. The supporting face 28 is co-axially arranged relative to the axis of rotation. The supporting face 28 is positioned inside the first claws 20.

A recess 23 is provided over part of the circumference of the supporting face 28. The recess 23 is in the form of an annular groove portion. If viewed circumferentially, the recess 23 is longer than a first gap 24. Recess ends 25, 26 are each positioned in the region of the first claw 20.

Figure 3:
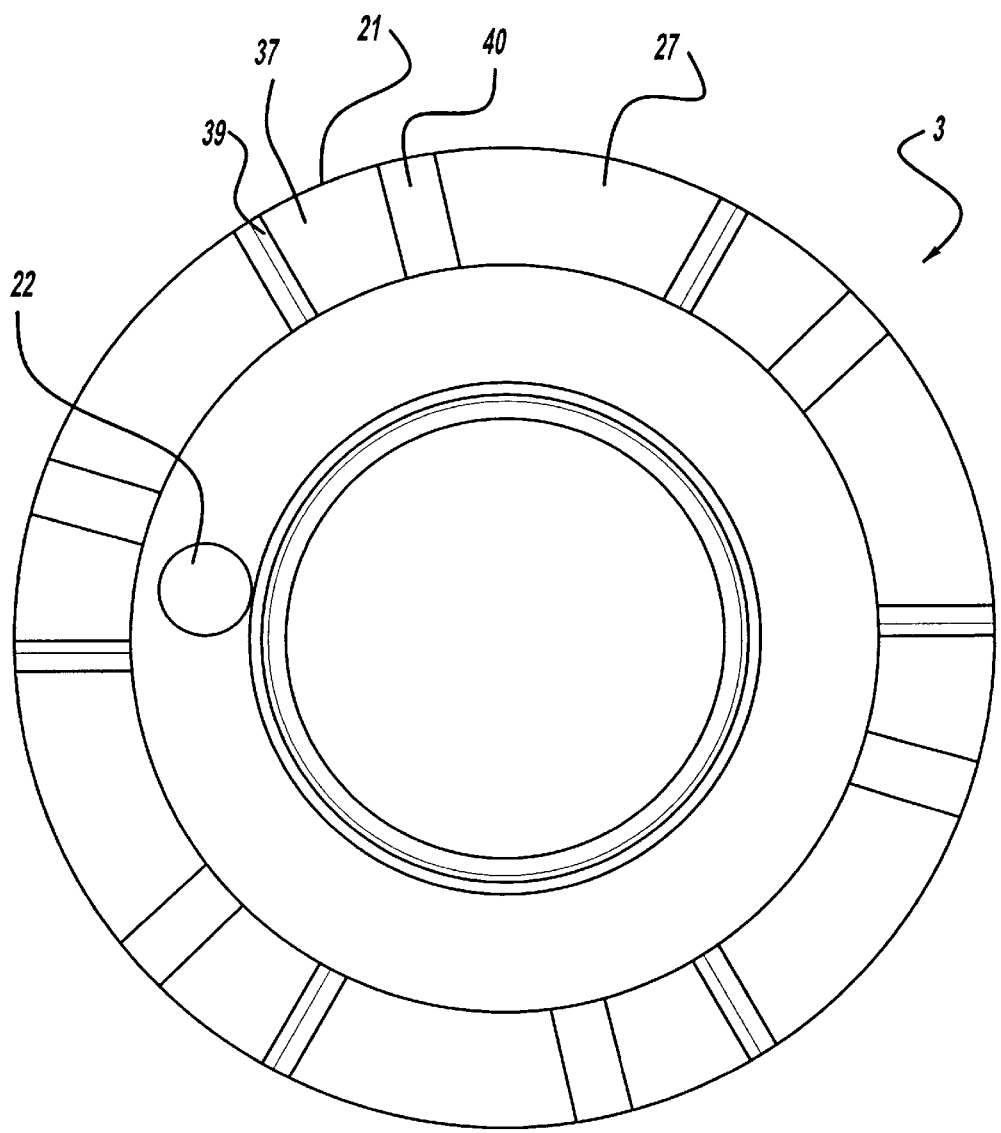
FIG. 3 is a plan view of a second coupling part with a cam.

FIG. 3 is a plan view of a second coupling part 3 in accordance with FIG. 1. The second claws 21 include torque transmitting flanks 39, 40. Second gaps 27 are formed between each two adjoining second claws 21. The flanks 39, 40 and gaps 27 are designed to correspond to the first claw flanks and the first gaps according to FIG. 2.

The cam 22 is arranged at approximately the same angle relative to a second claw 21. The cam 22 is angularly positioned relative to the second claws 21. The angular position and length of the recess 23 relative to the first claws are dimensioned such that, in the coupled condition, the cam 22 does not contact the ends 25, 26 of the recess 23. Thus, torque transmission by the cam 22 and one of the recess ends 25, 26 is avoided.

Figure 4:
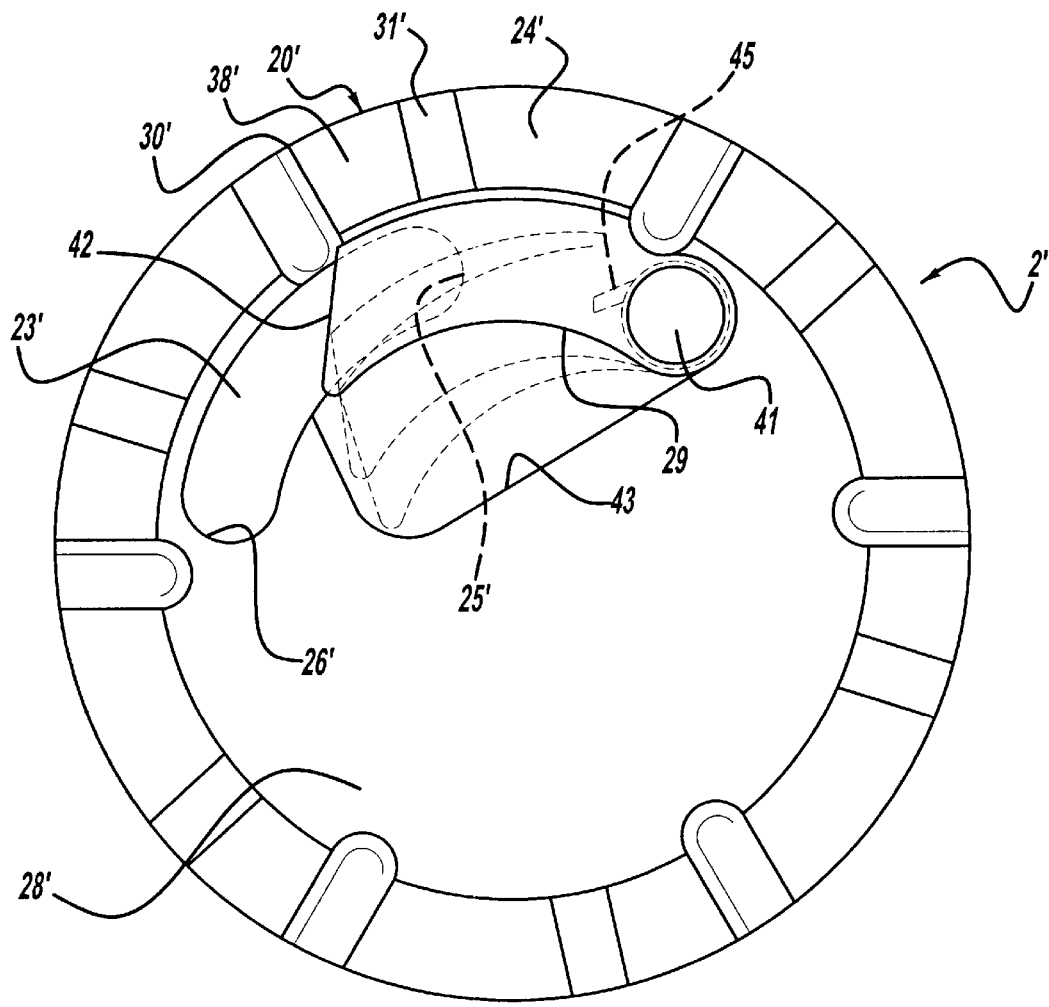
FIG. 4 is a plan view of a first coupling part with a supporting face, a recess and a cover.

FIG. 4 illustrates a plan view of a first coupling part 2' with a cover 29. The components corresponding with those of FIG. 2 have been given the same reference numbers and primed as in FIG. 2. The cover 29 covers part of the recess 23' starting from the end 25'. The cover 29 has a lever shape. The cover 29 is rotatably supported around a joint 41 which is arranged on the supporting face 28'. The cover 29 is flush with the supporting face 28'. In the region of the recess 23', the cover includes a stop face 42. The stop face 42 may be abutted by the cam 22 of the second coupling part 3. Due to the inclined position of the stop face 42, the cover 29 is pressed into a recess 43. When disengaging the cam 22, the cover 29 is pressed back into the starting position by a spring 45.

While the above detailed description describes the preferred embodiment of the present invention, the invention is susceptible to modification, variation and alteration without deviating from the scope and fair meaning of the subjoined claims.

What is claimed is:

1. A switchable claw coupling arranged around an axis of rotation, comprising:

a first axially fixed coupling part having first claws;

a second coupling part having an end face, said end face including second claws facing said first claws, said second coupling part being axially adjustable along the axis of rotation between a coupled position, where first and second claws engage one another, and an uncoupled position wherein the first and second claws are disengaged;

at least one annular supporting face associated with one of the first and second coupling parts, an end face on said supporting face arranged coaxially relative to the axis of rotation;

at least one cam associated with one of the first and second coupling parts is slidingly supported on the end face of said supporting face with the first and second claws being disengaged such that said two coupling parts rotate independently of one another;

a recess on said supporting face which extends over part of the circumference of the supporting face, said recess being axially engaged by said cam wherein said second coupling part being switched into the coupled position, and said cam in said coupled position of the second coupling part, if viewed in the circumferential direction, being unable to contact an end of the recess.

2. A claw coupling according to claim 1, wherein if viewed in the circumferential direction, two adjoining claws on each coupling part form gaps, and said first and second claws are each circumferentially shorter than said gaps.

3. A claw coupling according to claim 1, wherein said recess is a portion of an annular groove and said cam is a cylindrical pin.

4. A claw coupling according to claim 1, wherein part of the recess starting from at least one end is covered by a cover and in the coupled position of the second coupling part the cover can be adjusted by the cam against a spring force to at least partially uncover the recess.

* * * * *